United States Patent
Runft et al.

(10) Patent No.: US 6,880,807 B2
(45) Date of Patent: Apr. 19, 2005

(54) FLAP VALVE

(75) Inventors: Michael Runft, Rudersberg (DE); Ralph Krause, Waiblingen (DE); Uwe Knauss, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 41 days.

(21) Appl. No.: 10/399,964

(22) PCT Filed: Jun. 14, 2002

(86) PCT No.: PCT/DE02/02170
§ 371 (c)(1),
(2), (4) Date: Aug. 29, 2003

(87) PCT Pub. No.: WO03/019052
PCT Pub. Date: Mar. 6, 2003

(65) Prior Publication Data
US 2004/0026649 A1 Feb. 12, 2004

(30) Foreign Application Priority Data
Aug. 24, 2001 (DE) .......................................... 101 41 608

(51) Int. Cl.$^7$ ................................................ F16K 1/22
(52) U.S. Cl. ..................................... 251/305; 123/337
(58) Field of Search ................................ 251/304–306; 123/337, 568.18

(56) References Cited

U.S. PATENT DOCUMENTS

| | | | | |
|---|---|---|---|---|
| 2,882,010 A | * | 4/1959 | Bryant | ....................... 251/306 |
| 3,627,261 A | * | 12/1971 | Ludeman | .................... 251/305 |
| 6,604,516 B1 | * | 8/2003 | Krimmer et al. | ...... 123/568.18 |
| 6,659,427 B1 | * | 12/2003 | Krimmer et al. | ........... 251/306 |

FOREIGN PATENT DOCUMENTS

DE          199 34 113 A1      1/2001

* cited by examiner

*Primary Examiner*—Steven O. Douglas
(74) *Attorney, Agent, or Firm*—Ronald E. Greigg

(57) ABSTRACT

A flap valve for controlling a gas flow has an elastically deformable valve tube that conveys the gas flow and having a valve flap that is disposed in the valve tube for movement between an open position and a closed position by a flap shaft that can be driven in order to adjust the valve flap and which is disposed at an acute angle in relation to the valve tube axis, to which shaft the valve flap is fastened so that in the closed position of the valve flap, the flap normal encloses an acute angle with the valve tube axis, in order to assure only a slight amount of leakage in the closed position of the valve flap and a low opening torque, the outer contour of the valve flap is approximately oval in shape. Preferably, the outer contour is embodied as an ellipse.

19 Claims, 5 Drawing Sheets

FLAP VALVE

CROSS-REFERENCE TO RELATED APPLICATIONS

This application is a 35 USC 371 application of PCT/DE 02/02170 filed on Jun. 14, 2002.

BACKGROUND OF THE INVENTION

1. Field of the Invention

The invention relates to an improved flap valve for controlling a gas flow through a conduit.

2. Description of the Prior Art

In a known flap valve disclosed in DE 199 34 113 A1, the valve tube that conveys the gas flow is embodied as an elastically deformable thin-walled tube and the valve flap disposed in the valve tube is embodied as a rigid, circular disk. The flap shaft actuating the valve flap encloses an angle α with the valve tube axis of between 10° and 90°, preferably 45°. This embodiment of the flap valve allows the valve tube to be embodied without a through opening for the drive shaft. If the outer diameter of the valve flap is equal to the inner diameter of the valve tube, then the flap normal coincides with the axis of the valve tube. However, if the valve flap has an outer diameter greater than the inner diameter of the valve tube, then in the closed position of the valve flap, this results in an acute angle between the flap normal and the axis of the valve tube, the so-called opening angle. This opening angle is larger, the greater the diameter difference between the outer diameter of the valve flap and the inner diameter of the valve tube is. In the closed position of the valve flap, this diameter difference causes the valve tube to deform into an ellipse whose larger radius corresponds to the radius of the valve flap. When the flap valve is open, the valve flap only contacts the valve tube at two points.

With this structural design of the flap valve, it has turned out that as the angle between the valve tube axis and the flap normal decreases, i.e. as the oversizing of the diameter of the valve flap in relation to the inner diameter of the valve tube decreases, the risk of the valve flap becoming jammed in the valve tube increases. On the other hand, in a valve flap that is oversized to a large degree, the pressure load in the valve tube also causes the thin-walled tube in the closed position of the valve flap to recover to a circular tube and thus causes the valve tube to exert powerful radial forces on the flap edge of the valve flap, which restricts the movement of the valve flap. The permitted angular range for a positioning of the valve flap in relation to the valve tube axis is therefore relatively small.

SUMMARY OF THE INVENTION

The flap valve according to the invention has the advantage of having only slight leakages in the closed position since when the oval valve flap is closed, the elastically deformable tube cross section of the valve tube is slightly deformed radially into an oval, when viewed in the direction of the valve tube axis, and therefore fits very snugly against the valve flap. To this end, the valve tube in the adjustment region of the valve flap does not have to be particularly adapted to the valve flap but can instead retain the manufactured form of a hollow cylinder with a circular base. The oval shape of the valve flap minimizes the radial forces on the valve flap edge due to the pressure against the elastically deformable tube section so that the opening torque on the flap shaft is low. When the flap valve is open, there is a two-point contact between the valve flap and the valve tube with a likewise insignificant deformation of the tube section so that here, too, the actuation torque is quite low. An oval is understood to mean any closed, planar curve having a positive curvature at every point on the curve, which curvature at most is constant only in sections, and having at least four vertex points. Special cases among ovals include the ellipse or a selected Cassini's curve with $a > e \cdot \sqrt{2}$ (see Handbuch der Mathematik [Handbook of Mathematics], Walter Gellert, Leipzig, p. 449).

According to a preferred embodiment of the invention, the alignment of the valve flap in the valve tube is executed so that in the closed position of the valve flap, an opening angle component β enclosed between the axis of the valve tube and the projection of the flap normal onto the xz-plane of a Cartesian coordinate system is between 5° and 60°, where the valve tube axis coincides with the x-axis of the coordinate system and the origin of the coordinate system is situated at the intersecting point of the valve tube axis, the flap shaft axis, and the flap normal.

In the dimension range indicated, if a large opening angle component β is selected, then this reduces the risk of the valve flap jamming and also reduces the rotation angle in the flap shaft for moving the valve flap from its closed position into its open position and vice versa. When the flap valve is used as a throttle mechanism in the intake section of an internal combustion engine in which the valve flap is moved into its closed position by means of a return spring in the event of a failure of the electromotive actuator, this reduces the reverse rotation impulse generated by the return spring and reduces a destructive force component on the valve tube in the event of an uncontrolled closing of the valve flap, thus preventing the elastically deformable tube section of the valve tube from being destroyed.

The larger opening angle component β also has the advantage that when the valve tube and valve flap are being manufactured, greater manufacturing tolerances can be permitted while maintaining the same respective tolerances of the opening angle. As a result, the manufacturing costs for the flap valve can be reduced.

According to an advantageous embodiment of the invention, in the event of an elliptical embodiment of the outer contour of the valve flap with slightly different radii, the difference between the radii is selected as a function of the opening angle component β and a rounding of the flap edge of the valve flap executed in the axial direction of the valve flap so that the radial forces that the valve tube exerts on the flap edge of the valve flap in the closed position of the valve flap remain low. This maintains the desired minimal opening torque.

According to an advantageous embodiment of the invention, in addition to the above-described alignment of the valve flap in the valve tube, the valve flap is also tilted so that in addition to the opening angle component β in the xz-axis, the flap normal also has an opening angle component γ in the xy-axis of the above-defined Cartesian coordinate system. This opening angle component γ is the angle that is enclosed between the axis of the valve tube and the projection of the flap normal onto the xy-plane of the Cartesian coordinate system in the closed position of the valve flap, and is 0° to ±45°. This additional angular setting of the valve flap in relation to the valve tube further reduces the shaft rotation angle of the flap shaft. This permits the valve actuation times to be reduced.

One advantageous embodiment of the invention embodies the axial length of the elastically deformable, hollow cylindrical tube section of the valve tube as very large in relation to the axial length of the valve tube. This results in an improved deformability of the tube section in the flap adjustment region. Preferably, the valve tube as a whole is embodied as an elastically deformable tube, which is preferably embodied as a hollow cylinder, whose base extends at right angles to the tube axis.

The flap valve according to the invention is preferably used as an exhaust gas recirculation valve in the exhaust gas recirculation line of an internal combustion engine or as a throttle valve unit in the air inlet line of an intake section of an internal combustion engine.

BRIEF DESCRIPTION OF THE DRAWINGS

The foregoing and other features and advantages of the invention will become more apparent from the description contained herein below, taken in conjunction with the drawings, in which.

DESCRIPTION OF THE PREFERRED EMBODIMENTS

Figure 1:
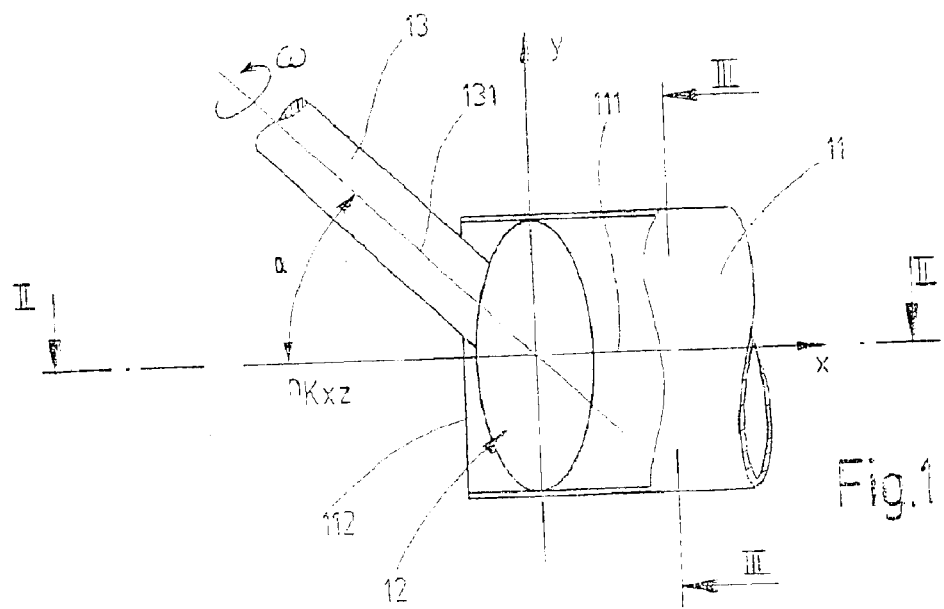
FIG. 1 schematically shows a detail of a side view of a flap valve, with a valve tube shown in a partially sectional depiction.
Figure 2:
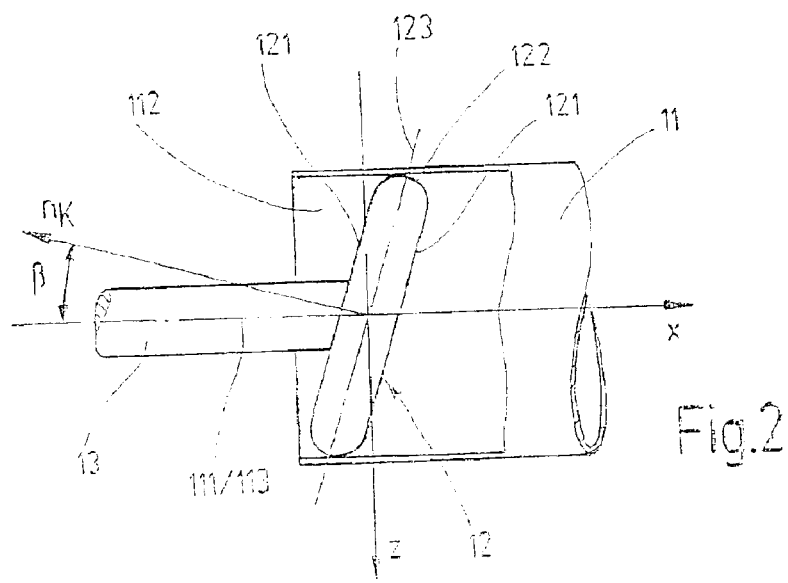
FIG. 2 shows a detail of a top view of the flap valve, with the valve tube shown in a partially sectional depiction along the line II—II in FIG. 1.
Figure 3:
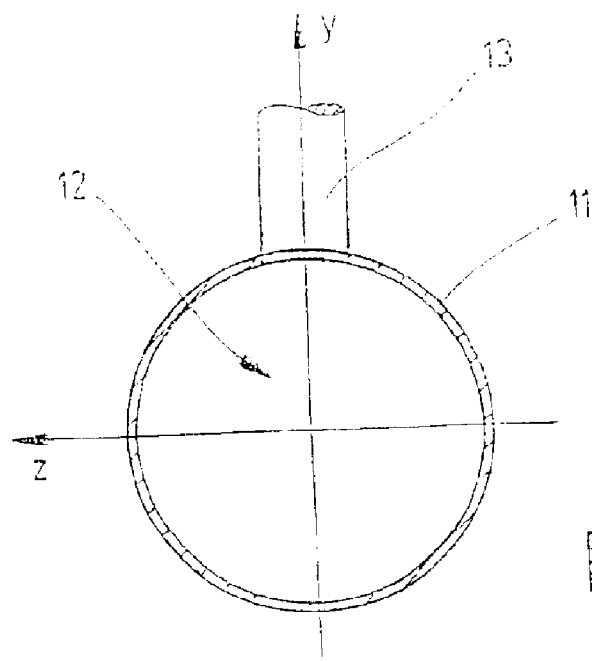
FIG. 3 shows a section along the line III—III in FIG. 1.
Figure 4:
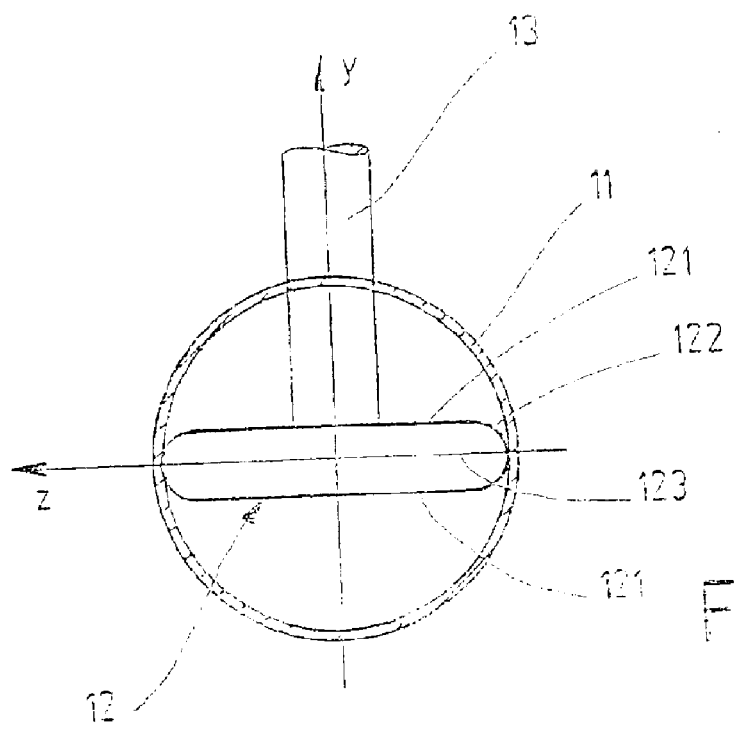
FIG. 4 shows a depiction equivalent to FIG. 3 when the flap valve is open, FIGS. 5 to 8 respectively show the same depictions as in FIGS. 1 to 4, but are of a modified flap valve.
Figure 5:
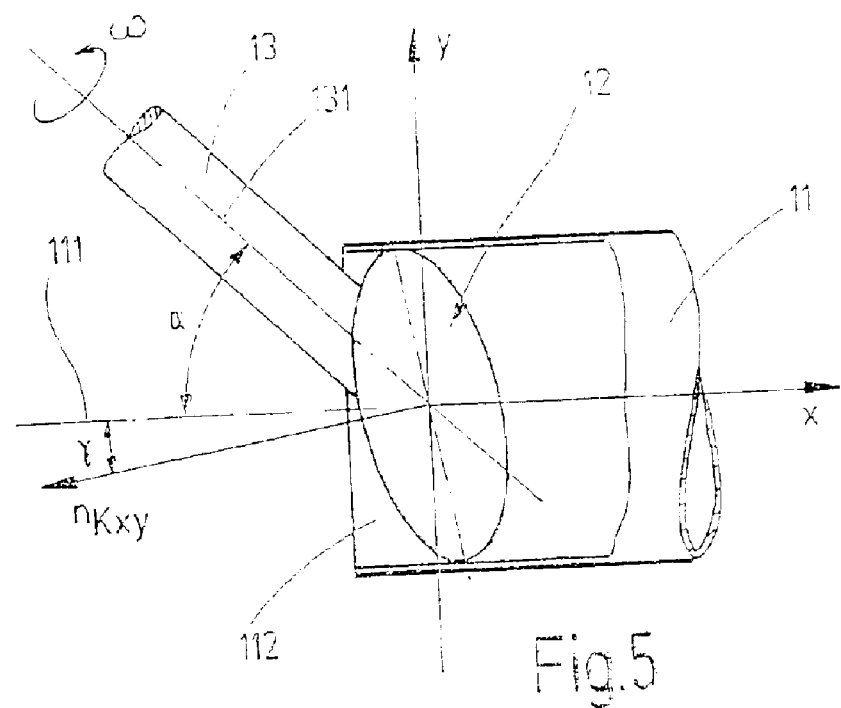
Figure 6:
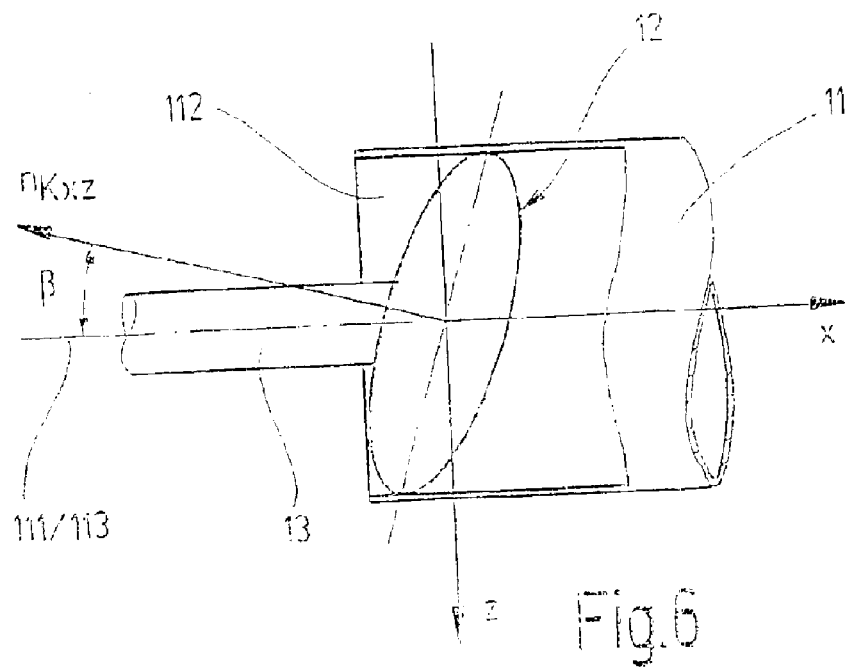
Figure 7:
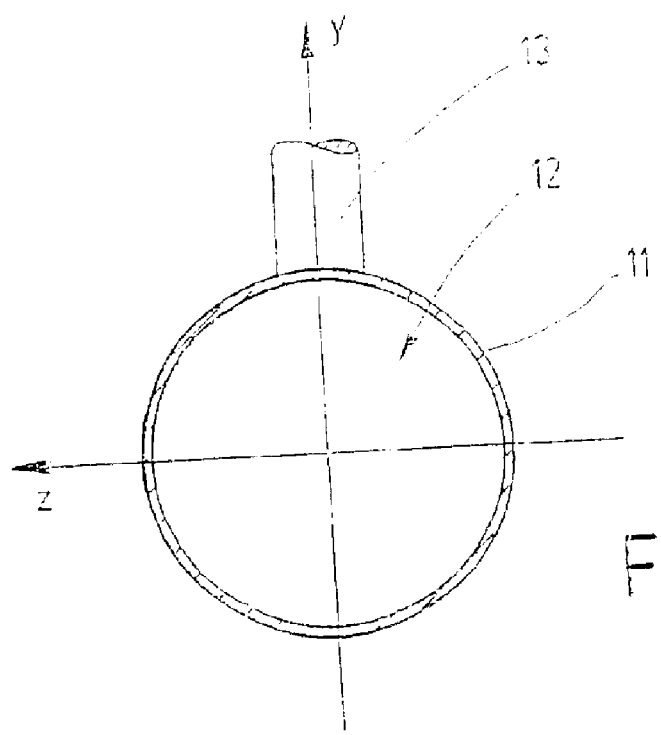
Figure 8:
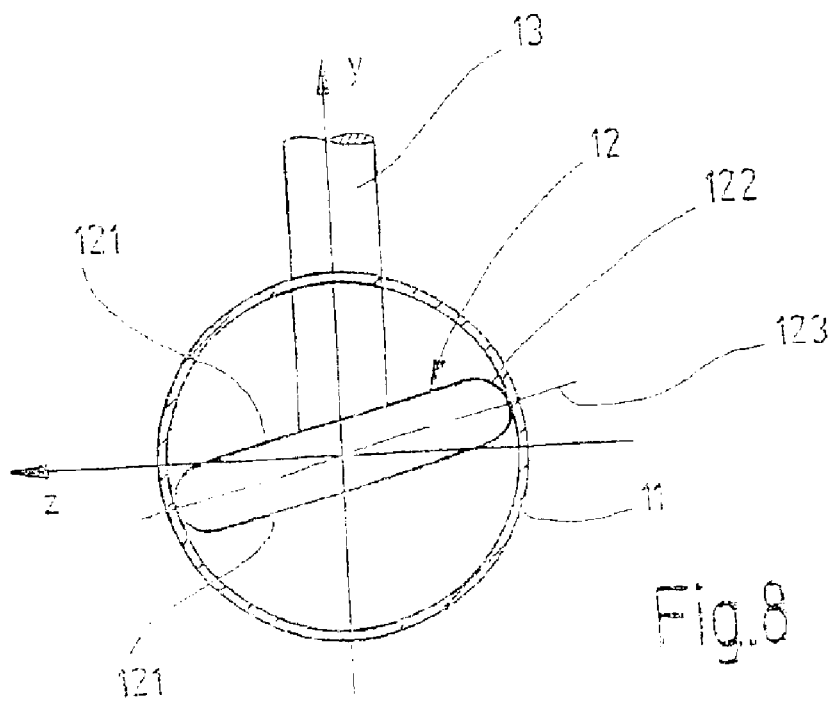

The flap valve, details of which are shown in different sectional views in FIGS. 1 to 4, is preferably used as an exhaust gas recirculation valve in an exhaust gas recirculation line of an internal combustion engine or in the air inlet line of an intake section of an internal combustion engine. The flap valve has a round, elastically deformable, preferably thin-walled valve tube 11 embodied as a hollow cylinder with a circular internal tube cross section 112, and has a valve flap 12 disposed in the end region of the valve tube 11 for controlling the tube cross section 112. The valve flap 12 is fastened to the end of a flap shaft 13 and, through rotation of the flap shaft 13, can be pivoted between an open position that maximally unblocks the tube cross section 112 of the valve tube 11 and a closed position that covers over an tube cross section 112 of the valve tube 11. FIGS. 1 to 3 show the valve flap 12 in its closed position and FIG. 4 shows the valve flap 12 in its open position. The flap shaft 13 is disposed so that its axis 131 encloses an acute angle α in relation to the axis 111 of the valve tube 11. In the above-described exemplary embodiments of the flap valve, the adjustment angle α of the flap shaft 13 is selected as α=45°, but can lie in an angular range from greater than or equal to 10° and less than 90°. The flap shaft 13 reaches into the valve tube 11 through the circular internal tube cross section 112 at the end of the valve tube 11 so that it is not necessary to provide a passage for the flap shaft 13 through the tube wall of the valve tube 11.

Figure 9:
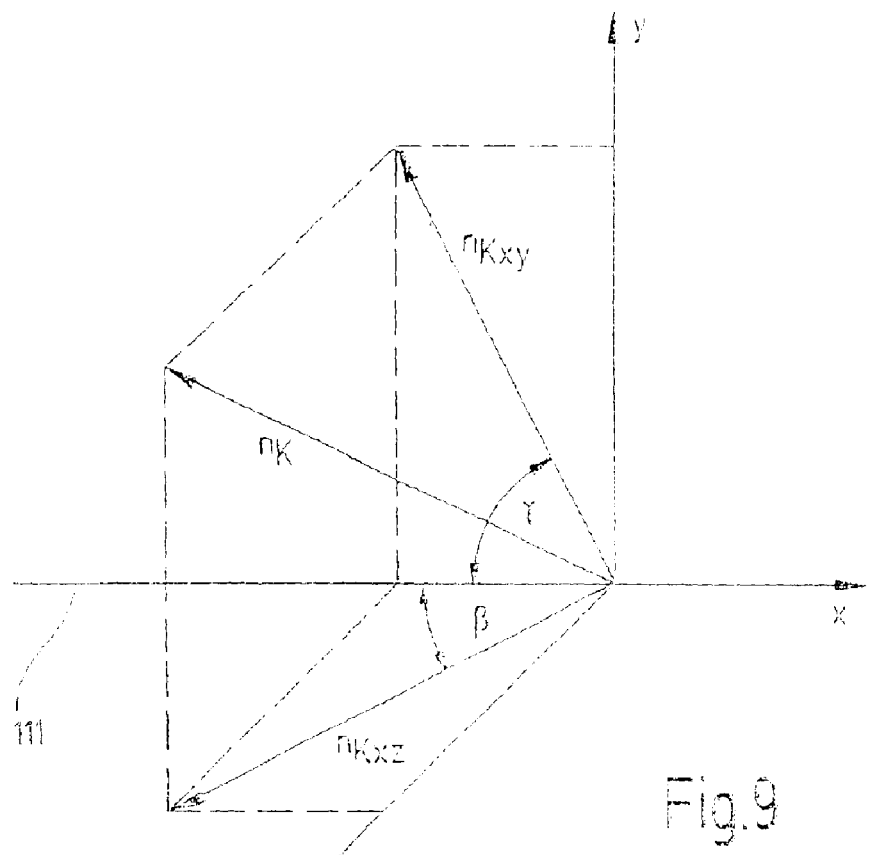
FIG. 9 shows a perspective view of the Cartesian coordinate system shown in FIGS. 1 to 8, including a depiction of a flap normal $n_K$ of the valve tube axis.

As is clear from FIGS. 2 and 4, the rigidly embodied valve flap 12 has two planar flap surfaces 121, which are spaced apart from each other and extend parallel to a principal plane 123 of the flap extending through the center of the thickness measurement of the valve flap 12 (FIGS. 2 and 4), has a flap edge 122 that is provided with a rounding preferably embodied as a radius, and has a circumferential outer contour extending in the principal plane 123 of the flap, which outer contour takes the form of an ellipse in the exemplary embodiment shown in FIGS. 1 to 4. The smaller radius of the ellipse corresponds approximately to the inner radius of the valve tube 11 and both of the radii of the ellipse are preferably only slightly different in size. Basically, the difference between the radii is determined by the opening angle component β of an opening angle of the valve flap 12, which opening angle component β is described below. This opening angle is achieved by virtue of the fact that the valve flap 12, which is disposed in its closed position, is not aligned at right angles to its axis 111 in the valve tube 11, but is adjusted in relation to the valve tube axis 111. In this connection, the opening angle component β is defined as the angle that the axis 111 of the valve tube 11 encloses with the projection $n_{Kxz}$ of the flap normal $n_K$ onto the xz-plane of a Cartesian coordinate system. The valve tube axis 111 in this case coincides with the x-axis of the coordinate system and the origin of the coordinate system lies at the intersecting point of the valve tube axis 111, the flap shaft axis 131, and the flap normal $n_K$. The flap normal $n_K$ is defined as perpendicular to the principal plane 123 of the flap. In FIG. 9, the Cartesian coordinate system is shown in a perspective view for the sake of clarity. The valve tube axis is labeled with the reference numeral 111. The flap normal $n_K$ is depicted with its projection $n_{Kxz}$ onto the xz-plane and its projection $n_{Kxy}$ onto the xy-plane in the form of vectors. The opening angle component β thus represents the setting of the flap normal $n_K$ in relation to the valve tube axis 111 in the xz-plane, whereas an opening angle component γ enclosed between the valve tube axis 111 and the projection $n_{Kxy}$ of the flap normal $n_K$ onto the xy-plane indicates the setting of the flap normal $n_K$ in relation to the valve tube axis 111 in the xy-plane. The opening angle component β can be arbitrarily selected between 5° and 60°.

In the exemplary embodiment shown in FIGS. 1 to 4, with an adjustment angle α of the flap shaft 13 whose axis 131 lies in the xy-plane, the valve flap 11 is aligned on the flap shaft 13 in relation to the valve tube axis 111 so that in the closed position of the valve flap 12, the flap normal $n_K$ lies in the xz-plane. As a result, the opening angle component γ=0, and the projection $n_{Kxz}$ of the flap normal $n_K$ is identical to the flap normal $n_K$. FIGS. 1 to 3 show the valve flap 12 in its closed position, in which it closes the tube cross section 112 of the valve tube 11. In FIG. 4, by rotating the flap shaft 13 by an angle ω, (FIG. 1), the valve flap 12 is moved into its open position in which it maximally unblocks the tube cross section 112 of the valve tube 11. The rotation angle ω for moving the valve flap 12 into its two end positions depends on the magnitude of the opening angle component β and decreases as the opening angle component β increases. With an opening angle component β=5°, the rotation angle ω is close to 180°.

In the closed position of the flap valve (FIG. 3), the elastically deformable valve tube 11 is radially deformed and fits snugly against the rounding of the flap edge 122 of the valve flap 12, thus producing a linear contact between the valve flap 12 and valve tube 11. In the open position of the flap valve (FIG. 4), however, there is only a two-point contact between the valve flap 12 and the valve tube 11. The inclined position of the valve flap 12 in relation to the valve tube axis 111 with the opening angle component β assures that the radial deformation of the valve tube 11 when the flap valve is closed does not exceed a particular amount so that the radial forces on the flap edge 122 initiated by the internal pressure in the valve tube 11 are not too great and thus only a relatively low opening torque is required to open the flap valve. The risk of jamming decreases as the opening angle component β increases. In addition, the larger opening angle component β has the advantage over a smaller opening angle component β that the manufacturing tolerances of the valve tube 11 and of the valve flap 12 can be increased while maintaining the same respective opening angle tolerances.

If the valve flap 12 is provided with a restoring device, not shown in detail here, e.g. a return spring, which returns the valve flap 12 to the closed position in the event of a failure of the torque on the flap shaft 13, then—as described above—as a result of the rotation travel ω that decreases as the opening angle component β increases, the reverse rotation impulse of the restoring device also decreases, thus reducing the destructive force component acting in the radial direction on the valve tube 11 when the valve flap 12 closes.

By contrast with the exemplary embodiment of the flap valve described in conjunction with FIGS. 1 to 4, the exemplary embodiment of a flap valve shown in FIGS. 5 to 8 is modified in that the alignment of the valve flap 12 on the flap shaft 13, which flap once again has an elliptical outer contour, is executed so that the flap normal $n_K$ is rotated out of the xz-plane and therefore has the additional opening angle component γ in relation to the valve tube axis 111. This opening angle component γ, which is equal to zero in the case of the exemplary embodiment in FIGS. 1 to 4, can be selected to equal up to ±45° in the exemplary embodiment in FIGS. 5 to 8. This additional angular adjustment of the flap normal $n_K$ in relation to the valve tube axis 111 in the xy-plane reduces the rotation angle ω of the flap shaft 13 to an ever greater degree as the opening angle component γ increases. Otherwise, the flap valve in the embodiment according to FIGS. 5 to 8 corresponds to the one in FIGS. 1 to 4 so that components that are the same are provided with the same reference numerals. FIGS. 5 to 8 show the same sectional depictions of the exemplary embodiment of the flap valve 11 as in FIGS. 1 to 4 so that the two exemplary embodiments of the flap valve shown can be compared to each other directly.

Figure 10:
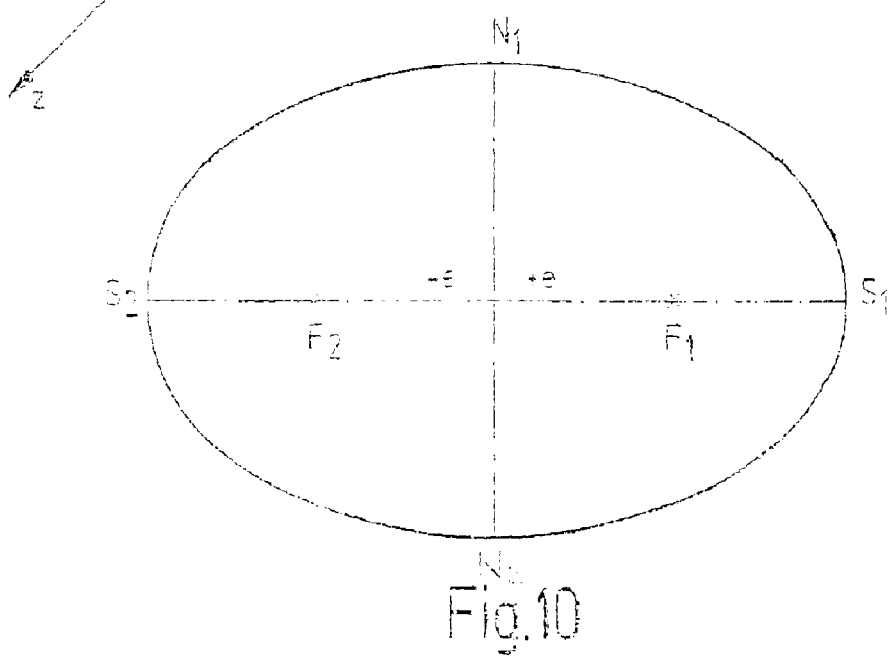
FIG. 10 shows a top view of a valve flap in another embodiment.

The invention is not limited to the exemplary embodiments described above. The elliptical embodiment of the outer contour of the valve flap 11 is only a preferred embodiment. Fundamentally, the outer contour can take the form of an oval. The definition of an oval is given at the beginning. One example of another possible oval form of the outer contour of the valve flap 12 is shown in FIG. 10. This outer contour is a so-called Cassini's curve. The Cassini's curve is defined as a locus of all points P for which the product of the distances r from two fixed points has a constant value $a^2$. If the fixed points $F_1$ and $F_2$ lie on the x-axis of a Cartesian coordinate system, at a distance of +e and −e from the origin, then:

$$r^2 = e^2 \cos 2\phi \pm \sqrt{e^4 \cos^2 \phi + a^4 - e^4}$$

For $a > e \cdot \sqrt{2}$, this curve approximates an ellipse and has four vertex points $S_1$, $S_2$ at $\pm\sqrt{a^2+e^2}$; 0 and $N_1$, $N_2$ at 0; $\pm\sqrt{a^2-e^2}$. In the exemplary embodiment in FIG. 9, values of a=10 and e=6 have been selected.

Furthermore, it is not absolutely necessary for the entire valve tube 11 to be embodied as flexible or elastically deformable. It is sufficient if such an embodiment of the valve tube 11 is carried out in a hollow cylindrical tube section and the valve flap 12 is disposed in this tube section, which can be embodied as thin-walled in order to achieve an even greater flexibility. The tube section, however, should be significantly larger than the axial stroke range of the valve flap in order to assure a sufficient flexibility of the tube section. The hollow cylindrical tube section is preferably provided at the end of the valve tube 11 so that the valve tube 11 does not have to be embodied with an opening to allow the flap shaft 13 to pass through.

In addition, the flap surface 121 of the valve flap 12 can be embodied as arched or in the form of a truncated cone, and the principal plane 123 of the flap can also extend other than in the center of the thickness measurement if the valve flap 12.

The foregoing relates to preferred exemplary embodiments of the invention, it being understood that other variants and embodiments thereof are possible within the spirit and scope of the invention, the latter being defined by the appended claims.

What is claimed is:

1. A flap valve for controlling a gas flow, comprising
   a valve tube (11) that conveys the gas flow and that has at least one elastically deformable, hollow cylindrical tube section,
   a valve flap (12) disposed inside the tube section for movement between an open position and a closed position, the valve flap (12) having a principal plane (123) which in its closed position covers over an inner valve tube cross section (112) and in its open position maximally unblocks this valve tube cross section, and
   a flap shaft (13) that can be driven in order to adjust the valve flap (12), the flap shaft (13) being disposed at an acute angle (α) in relation to the axis (111) of the valve tube (11), to which shaft the valve flap (12) is fastened so that in its closed position, an axis, which is referred to as the flap normal ($n_K$) and extends at right angles from the principal plane (123) of the flap, encloses an acute angle with the axis (111) of the valve tube (11),
   the valve flap (12) having an outer contour extending in the principal plane (123) of the flap, which contour is at least approximately oval in shape.

2. The flap valve according to claim 1, wherein the outer contour of the valve flap (12) is embodied in the form of an ellipse.

3. The flap valve according to claim 2, wherein the ellipse has two slightly different radii.

4. The flap valve according to claim 3, wherein the smaller radius approximately corresponds to the inner radius of the elastically deformable tube section.

5. The flap valve according to claim 1, wherein the valve flap (12) comprises two flap surfaces (121) which extend along both sides of the principal plane (123) of the flap and which are connected to each other by means of a flap edge (122) provided with a rounding.

6. The flap valve according to claim 5, wherein the alignment of the valve flap (12) in the valve tube (11) is executed so that in the closed position of the valve flap (12), an opening angle component (β) enclosed between the axis (111) of the valve tube (11) and the projection ($n_{Kxz}$) of the flap normal ($n_K$) onto the xz-plane of a Cartesian coordinate system is from 5° to 60°, where the axis (111) of the valve tube (11) coincides with the x-axis of the coordinate system and the origin of the coordinate system is situated at the intersecting point of the axis (111) of the valve tube (11), the axis (131) of the flap shaft (13), and the flap normal ($n_K$).

7. The flap valve according to claim 6, wherein the difference between the radii of the elliptical outer contour is selected as a function of the opening angle component (β) and the rounding of the flap edge (122) so that the radial forces that the valve tube (11) exerts on the flap edge (122) of the valve flap (12) in the closed position of the valve flap (12) are low.

8. The flap valve according to claim 7, wherein the rounding is embodied as a radius.

9. The flap valve according to claim 6, wherein the alignment of the valve flap (12) in the valve tube (11) is also executed so that an opening angle component (γ) enclosed between the axis (111) of the valve tube (11) and the projection ($n_{Kxy}$) of the flap normal ($n_K$) onto the xy-plane of the Cartesian coordinate system in the closed position of the valve flap (12) is 0° to ±45°.

10. The flap valve according to claim 7, wherein the alignment of the valve flap (12) in the valve tube (11) is also executed so that an opening angle component (γ) enclosed between the axis (111) of the valve tube (11) and the projection ($n_{Kxy}$) of the flap normal ($n_K$) onto the xy-plane of the Cartesian coordinate system in the closed position of the valve flap (12) is 0° to ±45°.

11. The flap valve according to claim 8, wherein the alignment of the valve flap (12) in the valve tube (11) is also executed so that an opening angle component (γ) enclosed between the axis (111) of the valve tube (11) and the projection ($n_{Kxy}$) of the flap normal ($n_K$) onto the xy-plane of the Cartesian coordinate system in the closed position of the valve flap (12) is 0° to ±45°.

12. The flap valve according to claim 1, wherein the elastically deformable tube section is embodied at one end of the valve tube (11).

13. The flap valve according to claim 1, wherein the elastically deformable tube section is embodied as thin-walled.

14. The flap valve according to claim 12, wherein the elastically deformable tube section is embodied as thin-walled.

15. The flap valve according to claim 1, wherein the valve tube (11) as a whole is embodied as an elastically deformable tube.

16. The flap valve according to claim 15, wherein the valve tube (11) is embodied as thin-walled.

17. The flap valve according to claim 5, wherein that the flap surfaces (121) are embodied as planar and extend parallel to the principal plane (123) of the flap.

18. The flap valve according to claim 1, wherein the flap valve is an exhaust gas recirculation valve in an exhaust gas recirculation line of an internal combustion engine.

19. The flap valve according to claim 1, wherein the flap valve is an air inlet control valve in the air inlet line of an intake section of an internal combustion engine.

* * * * *